United States Patent
Katsuki et al.

[11] Patent Number: 6,019,517
[45] Date of Patent: Feb. 1, 2000

[54] PREFORMED PIECES FOR OUTER AND INNER RACES OF BEARINGS

[75] Inventors: Manabu Katsuki, Himeji; Yoshio Kasahara, Okayama, both of Japan

[73] Assignee: Sanyo Special Steel Co., Ltd., Hyogo-Ken, Japan

[21] Appl. No.: 09/177,499

[22] Filed: Oct. 23, 1998

Related U.S. Application Data

[62] Division of application No. 09/132,680, Aug. 12, 1998, which is a division of application No. 08/833,446, Apr. 7, 1997, abandoned.

[30] Foreign Application Priority Data

Apr. 8, 1996 [JP] Japan ................................. 8-111937

[51] Int. Cl.[7] .............................. F16C 33/58; B21C 1/00; B21F 1/00
[52] U.S. Cl. .................. 384/516; 384/569; 384/513; 428/577; 428/587; 29/898.066
[58] Field of Search .................... 384/515, 516, 384/490, 560, 569, 625; 29/898.04, 898.042, 898.043, 898.045, 898.057, 898.066, 898.063; 428/577, 578, 579, 581, 587, 596, 599

[56] References Cited

U.S. PATENT DOCUMENTS

| | | | |
|---|---|---|---|
| 4,506,422 | 3/1985 | Egusa | 29/898.066 |
| 4,643,595 | 2/1987 | Weavers | 384/513 X |
| 5,102,241 | 4/1992 | Pflungner | 384/513 X |
| 5,193,916 | 3/1993 | Andersson | 384/513 X |
| 5,218,764 | 6/1993 | Suzuki | 29/898.066 |
| 5,340,221 | 8/1994 | Yasuda et al. | 384/513 X |

FOREIGN PATENT DOCUMENTS 1-488083A1  6/1989  U.S.S.R. .

*Primary Examiner*—Tamara L. Graysay
*Assistant Examiner*—Brandon C. Stallman
*Attorney, Agent, or Firm*—Birch, Stewart, Kolasch & Birch, LLP

[57] ABSTRACT

A bearing outer-race performed piece has a turning stock on an outer periphery thereof and has a circular bearing groove on an inner surface thereof. The bearing groove has a cross-section which includes circular portions defined by a circle of a greater diameter than that of a bearing groove of a bearing outer-race product, and a flat portion being arranged between the circular portions at a location shifted toward the center of the circle of the circular portions from a bottom locus of the circular portions.

4 Claims, 5 Drawing Sheets

PREFORMED PIECES FOR OUTER AND INNER RACES OF BEARINGS

This application is a divisional of application Ser. No. 09/132,680, filed on Aug. 12, 1998, which is a divisional of application Ser. No. 08/833,446 filed on Apr. 7, 1997, (now abandoned), the entire contents of which are hereby incorporated by reference.

BACKGROUND OF THE INVENTION

1. Field of The Invention

The present invention relates generally to a preformed piece for an outer or inner race of a bearing, method for manufacturing same, and a mandrel and a roll used therein. More specifically, the invention relates to the shape of a forming die comprising a mandrel and a roll, which is used for forming a preformed piece for an outer or inner race of a bearing having a bearing ring, using the cold rolling working.

2. Description of The Prior Art

In a conventional method for manufacturing an outer or inner race of a bearing, a steel blank is hot-forged to obtain an annular blank. Then, after the annular blank is annealed and shot-blasted, it is cold-rolled to form a preformed piece 1 for a bearing outer race (which will be hereinafter referred to as "a bearing outer-race preformed piece") or a preformed piece 14 for a bearing inner race (which will be hereinafter referred to as a "bearing inner-race preformed piece"), as illustrated in FIGS. 6 and 7. The term "preformed piece" as used herein means an object that has been subjected to preliminary incomplete shaping before undergoing complete or final processing. The preformed piece thus obtained is turned by means of a lathe to produce a bearing outer-race product or a bearing inner-race product of a product shape 6 or 19 illustrated by a two-dot chain line in FIGS. 6 and 7. In the cold rolling working, an inner raceway groove 7 or an outer raceway groove 20, which has a circular curved surface, is provided on an inner surface 2a of the bearing outer race or an outer surface 15b of the bearing inner race to form the bearing outer-race preformed piece 1 or the bearing inner-race preformed piece 14.

In the case of the bearing inner-race preformed piece 14 having the raceway groove on the outer surface 15b thereof, the core run out is easy to occur since the bearing inner-race preformed piece 14 is held by at tightening chuck when it is turned to form a final product. For that reason, an unbalanced load is easy to be applied thereto, so that the product yield is poor. Therefore, the number of the bearing inner-race preformed piece 14 having the raceway groove is less than the number of the bearing outer-race preformed piece 1 having the raceway groove. In addition, the forming-die surface of a forming die of a mandrel or a roll used for forming these bearing preformed pieces using the cold rolling working, has a bearing ring shape, which is obtained by adding a turning stock y of 1.5 mm shown in the drawing to the turned surface of the bearing ring of the bearing outer-race product or the bearing inner-race product, in order to facilitate the turning working.

In the turning of the bearing preformed piece formed by the mandrel or roll, when a turning tool for finishing having a turned curved-surface cuts into the bearing outer-race product or the bearing inner-race product to the turned curved-surface of the bearing ring, elongated thin chips are produced particularly at the beginning of turning. In addition, when the center of the bearing ring is offset, the direction for discharging the chips can not be determined, so that the chips enter a gap between the working face and knock-out face of a collet chuck which holds the preformed piece. Thus, the nipped chips may get into trouble such as the production of defective products. In addition, the chipping of the turning tool for finishing may occur due to the unbalanced load, so that the turning tool for finishing must be used while being rotated by three or four surfaces, thereby decreasing the life time of the tool.

SUMMARY OF THE INVENTION

It is therefore an object of the present invention to eliminate the aforementioned problems and to prevent elongated fine chips from occurring at the beginning of turning when a bearing outer-race preformed piece or a bearing inner-race preformed piece is turned to form a bearing ring of a bearing outer-race product or a bearing inner-race product, so as to prevent the chips from being nipped and to prevent the chipping of a tool due to unbalanced load.

In order to accomplish the aforementioned and other objects, according to one aspect of the present invention, there is provided a bearing outer-race preformed pieces, which has a turning stock on an outer periphery thereof and which has a circular bearing ring on an inner surface thereof, the bearing ring having a cross-section which comprises circular portions defined by a circle of a greater diameter than that of a bearing ring of a bearing outer-race product, and a flat portion being arranged between the circular portions at a location shifted toward the center of the circle of the circular portions from a bottom locus of the circular portions.

According to another aspect of the present invention, there is provided a bearing inner-race preformed pieces, which has a turning stock on an inner periphery thereof and which has a circular bearing ring on an outer surface thereof, the bearing ring having a cross-section which comprises circular portions defined by a circle of a greater diameter than that of a bearing ring of a bearing inner-race product, and a flat portion being arranged between the circular portions at a location shifted toward the center of the circle of the circular portions from a bottom locus of the circular portions.

According to another aspect of the present invention, there is provided a method for manufacturing a bearing outer-race preformed piece, comprising the steps of: hot-forging a steel blank to form an annular steel blank; and cold-rolling the annular steel blank to form a bearing outer-race preformed piece, the cold-rolling is carried out while a forming-die surface of a mandrel, which has a circular projecting bearing-ring surface and a flat portion arranged at the top portion of the circular projecting bearing-ring surface, is brought into contact with an inner surface of the annular steel blank.

According to another aspect of the present invention, there is provided a method for manufacturing a bearing inner-race preformed piece, comprising the steps of: hot-forging a steel blank to form an annular steel blank; and cold-rolling the annular steel blank to form a bearing inner-race preformed piece, the cold-rolling is carried out while a forming-die surface of a roll, which has a circular projecting bearing-ring surface and a flat portion arranged at the top portion of the circular projecting bearing-ring surface, is brought into contact with an outer surface of the annular steel blank.

According to further aspect of the present invention, there is provided a mandrel used for manufacturing a bearing outer-race preformed piece by a cold rolling working, the mandrel having a profile of a forming-die surface which comprises: circular portions corresponding to a profile of a cross-section of an internal bearing ring of the bearing outer-race preformed piece which has a greater diameter of an internal bearing ring of a bearing outer-race product formed by turning the bearing outer-race preformed piece; and a flat portion between the circular portions, the flat portion being parallel to an inner surface of the internal bearing ring of the bearing outer-race preformed piece at a lower location than a top of locus of the internal bearing ring of the bearing outer-race preformed piece.

According to still further aspect of the present invention, there is provided a roll used for manufacturing a bearing inner-race preformed piece by a cold rolling working, the roll having a profile of a forming-die surface which comprises: a profile of a cross-section of an external bearing ring of the bearing inner-race preformed piece which has a greater diameter of an external bearing ring of a bearing inner-race product formed by turning the bearing inner-race preformed piece; and a flat portion which is parallel to an outer surface of the external bearing ring of the bearing inner-race preformed piece at a lower location than a top of locus of the external bearing ring of the bearing inner-race preformed piece.

According to the present invention, since the bearing outer-race preformed piece or the bearing inner-race preformed piece which have a flat portion on the bottom of the circular bearing ring, the forming-die surface of the mandrel or roll for the cold rolling working has a shape obtained by turning over the cross-section of the bearing ring which has the flat portion the bottom of the internal or external bearing ring of the bearing outer-race preformed formed piece or the bearing inner-race preformed piece.

Thus, it is possible to easily form the bearing outer-race preformed piece or the bearing inner-race preformed piece, which have the flat portion on the bottom of the circular bearing ring, by cold-rolling a hot-forged steel blank by means of the mandrel or roll. In addition, since the formed bearing outer-race preformed piece or bearing inner-race preformed piece has a flat surface on the bottom of the circular raceway groove formed on the inner or outer surface thereof, it is possible to easily cut into the bearing ring at the beginning of turning when the bearing outer-race product or bearing inner-race product is finished by a turning tool for finishing, so that chips are discharged in a constant direction without being nipped. Therefore, it is possible to prevent the core run out and to prevent defective products from occurring.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to specific embodiments, but are for explanation and understanding only.

In the drawings:

FIGS. 1A and 1B are view explaining the forming of a bearing outer-race preformed piece according to the present invention, wherein FIG. 1A is a sectional view illustrating profiles of a mandrel and a roll and FIG. 1B is a sectional view of the bearing outer-race preformed piece;

FIGS. 2A and 2B are view explaining the forming of a bearing inner-race preformed piece according to the present invention, wherein FIG. 2A is a sectional view illustrating profiles of a mandrel and a roll and FIG. 1B is a sectional view of the bearing inner-race preformed piece;

FIGS. 3A through 3D are sectional views illustrating a bearing preformed piece according to the present invention, wherein FIG. 3A illustrates a bearing outer-race product, FIG. 3B is a partially enlarged view thereof, FIG. 3C illustrates a bearing inner-race product, and FIG. 3D is a partially enlarged view thereof;

DESCRIPTION OF THE PREFERRED EMBODIMENT

Figure 1A:
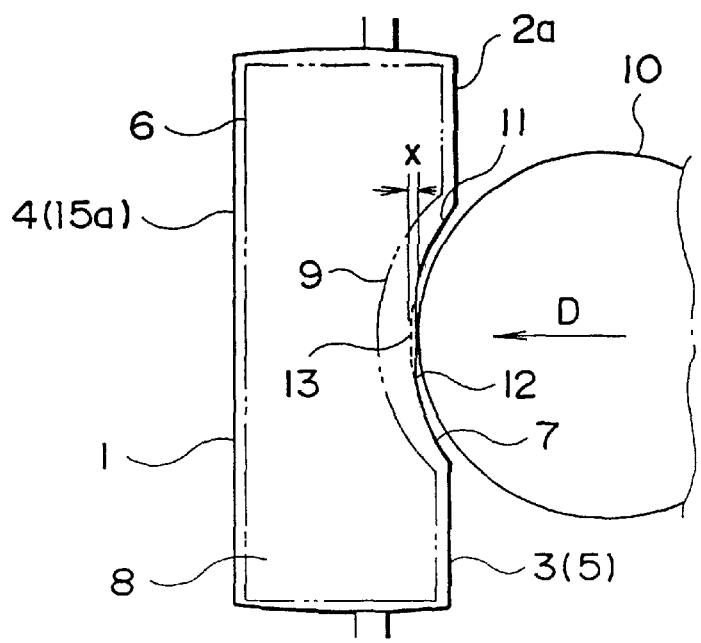

Referring now to the accompanying drawings, particularly to FIGS. 1 through 5, the preferred embodiments of the present invention will be described below.

First, after a steel blank is hot-forged, annealed and shot-blasted, the resulting blank is cold-rolled to form a bearing outer-race preformed piece 1 or a bearing inner-race preformed piece 14 by the cold rolling working. In this cold rolling working, an internal raceway groove serving as an internal bearing ring 7 is formed in an inner surface 2a of the bearing outer-race preformed piece 1, or an external raceway groove serving as an external bearing ring 20 is formed in an outer surface 15b of the bearing inner-race preformed piece 14. The bearing outer-race preformed piece 1 or bearing inner-race preformed piece 14 is turned to form a bearing outer-race product or a bearing inner-race product. Therefore, the bearing outer-race preformed piece 1 or bearing inner-race preformed piece 14 is greater than the bearing outer-race product and bearing inner-race product by a finishing stock for turning the outer peripheral portion thereof.

Figure 1B:
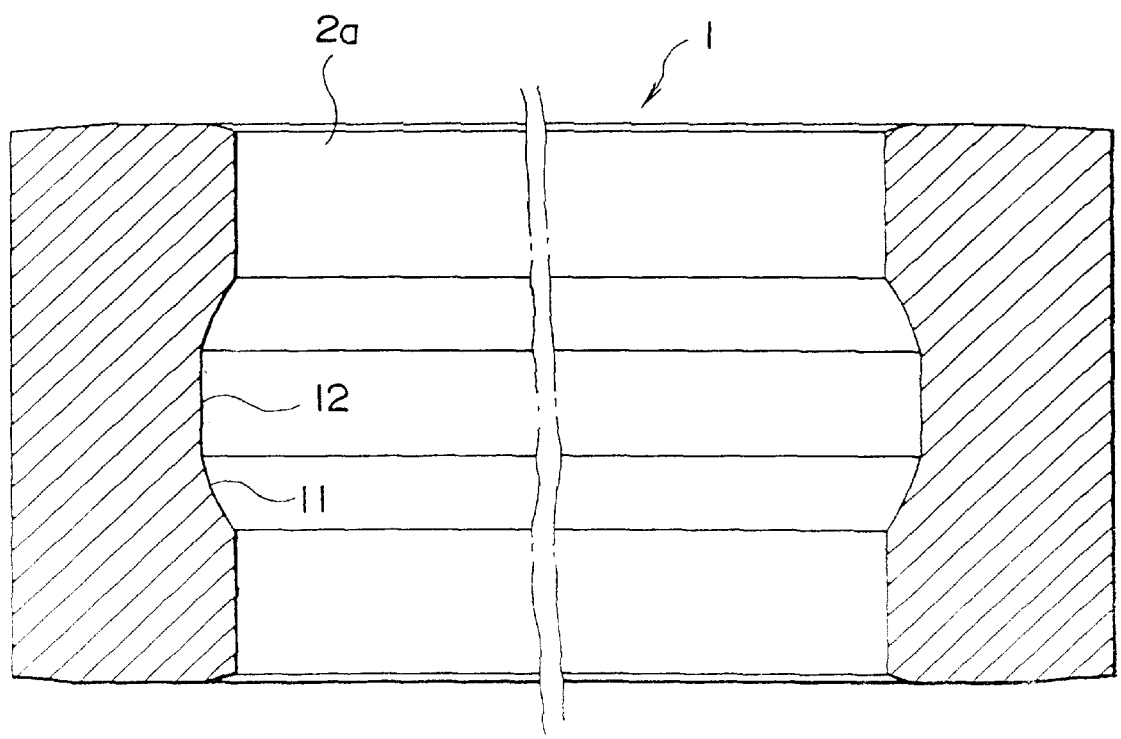

Referring to FIGS. 1A and 1B, the bearing outer-race preformed piece 1 will be described below.

The profile of a cross-section of the bearing outer-race preformed piece 1 is expressed by a full line in FIG. 1A, and this corresponds to the left profile of the cross-section of the bearing outer-race preformed piece shown in FIG. 1B. The region surrounded by a two-dot chain line in FIG. 1A corresponds to a finishing stock to be turned. The internal raceway groove serving as the internal bearing ring 7 is formed in the inner surface of the bearing outer-race preformed piece 1. The profile of the internal bearing ring 7 comprises circular profile portions 11 on both sides thereof, and a flat profile portion 12 at the center thereof. The straight-line portion of the flat profile portion 12 is formed at a height of about 0.2 mm toward the central axis C of the outer race from a bearing ring bottom 13 expressed by a dotted line in FIG. 1A. The height x of the flat profile portion 12 from the bearing ring bottom 13 is optimally about 0.2 mm to prevent the offset of center of a tool when turning and to easily carry out the working. When the height x is 0.1 mm, it is not possible to prevent the offset of center. When the height x is greater than 0.2 mm, although it is possible to prevent the offset of center, the excessive turning must be carried out, so that the efficiency is low.

In addition, the radius of curvature of the circular profile portion 11 is greater than the radius of curvature of a product internal bearing ring 9 expressed by the two-dot chain line in FIG. 1A. Therefore, the thickness of the finishing stock from the bottom of the product internal bearing ring 9 to the flat profile portion 12 is about 1.7 mm. In the case of this thickness of the finishing stock, the most effective turning can be carried out.

The turning of the bearing ring is carried out while a turning tool for finishing 10, which has a shape corresponding to that of the product internal bearing ring 9, is moved in direction D. Therefore, according to the present invention, the tip of the turning tool for finishing 10 point-contacts the center of the flat profile portion 12 to start the turning. Thus, at the beginning of the cutting into the bearing ring, a sufficiently large gap occurs between the edge of the turning tool for finishing 10 and the preformed piece to be worked, so that the chips can easily escape without being nipped therebetween. In addition, it is difficult to cause the offset of center of the bearing ring, so that the discharging direction of the chips is constant. Therefore, according to the present invention, it is possible to prevent fine chips from entering a gap between the working face and knock-out face of a collet chuck to prevent the offset of center and to prevent defective products from occurring, so that it is possible to achieve a good turning without getting into trouble.

The profile of the bearing outer-race preformed piece 1 expressed by the full line in FIG. 1A, also shows a profile 3 of a forming-die surface of a mandrel (which will be hereinafter referred to as a "mandrel forming-die surface profile") and a profile 4 of a forming-die surface of a roll (which will be hereinafter referred to as a "roll forming-die surface profile"), which are used for the cold rolling working of the bearing outer-race preformed product 1. The right profile shows the mandrel forming-die surface profile 3, and the left profile shows the roll forming-die surface profile 4. Therefore, the mandrel forming-die surface profile 3 comprises the circular profile portions 11 on both sides, which correspond to the sectional profile of the preformed-piece internal bearing ring having a greater diameter than that of the product internal bearing ring obtained by turning the bearing outer-race preformed piece, and the flat profile portion 12, which is parallel to the inner surface of the bearing arranged between the circular profile portions 11 at a location lower than the top of locus expressed by the dotted line in FIG. 1A by about 0.2 mm to the right. Since the outer surface 15a of the bearing outer-race profiled piece 1 is a flat surface, the roll forming-die surface profile 4 is also a simple flat surface.

Figure 2A:
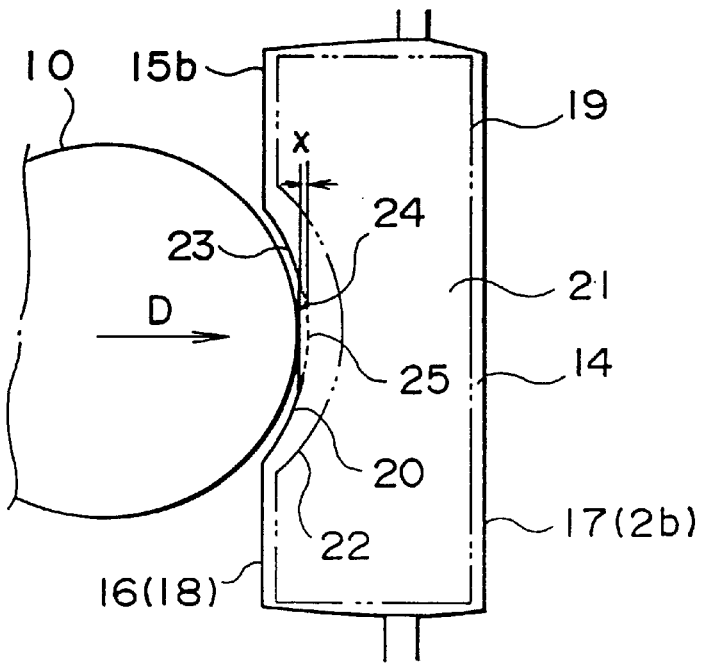
Figure 2B:
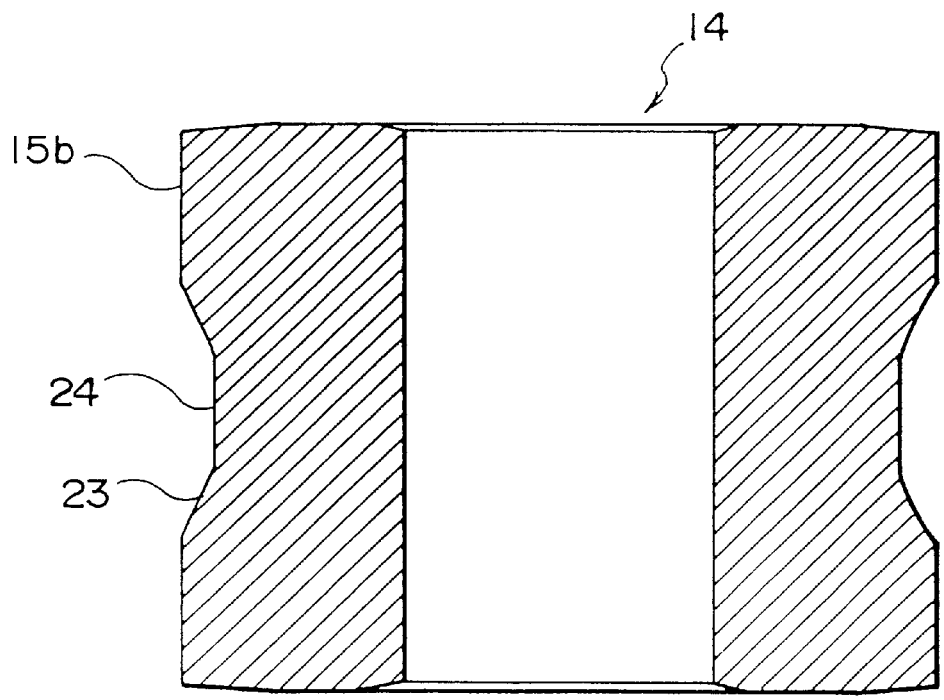

Referring to FIGS. 2A and 2B, the bearing inner-race profiled piece 14 will be described below.

The profile of a cross-section of the bearing inner-race preformed piece 14 is expressed by a full line in FIG. 2A, and this corresponds to the left profile of the cross-section of the bearing inner-race preformed piece 14 expressed in FIG. 2B. In the case of this bearing inner-race preformed piece 14, a preformed-piece external bearing ring 20 is formed in the outer surface 15b thereof, unlike the bearing outer-race preformed piece 1 of FIG. 1 having the preformed-piece internal bearing ring 7 in the inner surface thereof. Therefore, the bearing ring itself of the bearing inner-race preformed piece 14 is the same as that of the bearing outer-race preformed piece 1, except that the bearing ring is formed in the inner surface, not in the outer surface.

The region surrounded by a two-dot chain line in FIG. 2A corresponds to a finishing stock to be turned. The external raceway groove serving as the external bearing ring 20 is formed in the outer surface of the bearing inner-race preformed piece 14. The profile of the external bearing ring 20 comprises circular profile portions 23 on both sides of the bearing ring and a flat profile portion 24 at the center of the bearing ring. The straight-line portion of the flat profile portion 24 is formed at a height of about 0.2 mm toward the central axis C of the inner race from a bearing-ring bottom 25 expressed by a dotted line in FIG. 2A. The height x of the flat profile portion 24 from the bearing-ring bottom 25 is optimally about 0.2 mm to prevent the offset of center of the tool when turning and to easily carry out the working. When the height x is 0.1 mm, it is not possible to prevent the offset of center. When the height x is greater than 0.2 mm, although it is possible to prevent the offset of center, the excessive turning must be carried out, so that the efficiency is low. In addition, the radius of curvature of the circular profile portion 23 is greater than the radius of curvature of a product external bearing ring 22 expressed by the two-dot chain line in FIG. 2A. Therefore, the thickness of the finishing stock from the bottom 25 of the product external bearing ring 22 to the flat profile portion 24 is about 1.7 mm. In the case of this thickness of the finishing stock, the most effective turning can be carried out.

The turning of the bearing ring is carried out while a turning tool for finishing 10, which has a shape corresponding to that of the product external bearing ring 22, is moved in direction D. Therefore, according to the present invention, in the bearing inner race similar to the bearing outer race shown in FIGS. 1A and 1B, the tip of the turning tool for finishing 10 point-contacts the center of the flat profile portion 12 to start the turning. Thus, at the beginning of the cutting into the bearing ring, a sufficiently large gap occurs between the edge of the turning tool for finishing 10 and the preformed piece to be worked, so that the chips can easily escape without being nipped therebetween. In addition, it is difficult to cause the offset of center of the bearing ring, so that the discharging direction of the chips is constant. Therefore, according to the present invention, it is possible to prevent the offset of center due to fine chips, so that it is possible to achieve a good turning without producing defective products.

The profile of the bearing inner-race preformed piece 14 expressed by the full line in FIG. 2A, also shows a profile 16 of a forming-die surface of a roll (which will be hereinafter referred to as a "roll forming-die surface profile") and a profile 17 of a forming-die surface of a mandrel (which will be hereinafter referred to as a "mandrel forming-die surface profile"), which are used for the cold rolling working of the bearing inner-race preformed product 14. The left profile shows the roll forming-die surface profile 16, and the right profile shows the mandrel forming-die surface profile 17. Therefore, the roll forming-die surface profile 16 comprises the circular profile portions 23 on both sides, which correspond to the sectional profile of the preformed-piece external bearing ring having a greater diameter than that of the product external bearing ring obtained by turning the bearing inner-race preformed piece, and the flat profile portion 24, which is parallel to the outer surface of the bearing arranged between the circular profile portions 23 at a location lower than the top of locus expressed by the dotted line in FIG. 2A by about 0.2 mm to the left. Since the inner surface 2a of the bearing inner-race profiled piece 14 is a flat surface, the mandrel forming-die surface profile 17 is also a simple flat surface.

Figure 3A:
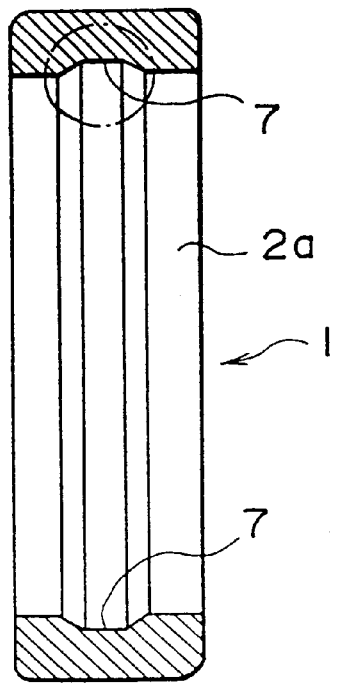
Figure 3B:
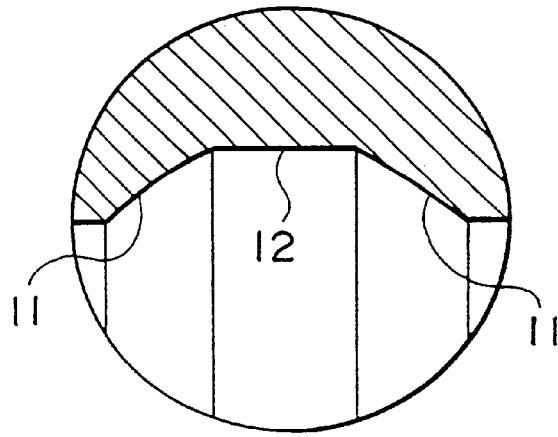
Figure 3C:
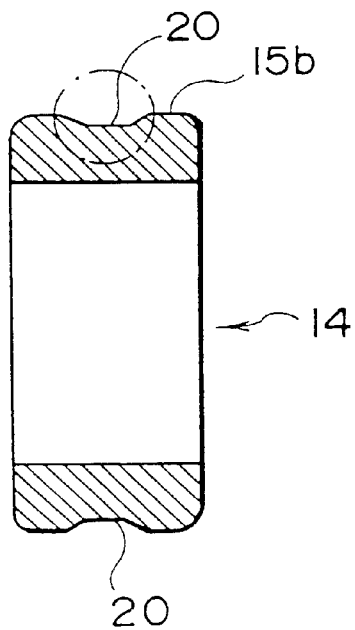
Figure 3D:
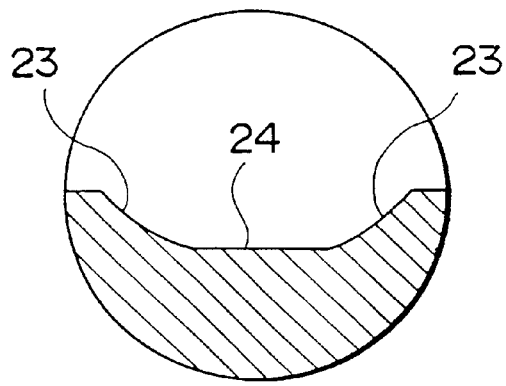

FIGS. 3A through 3D show cross-sections of the bearing rings of the bearing outer-race preformed piece 1 and the bearing inner-race preformed piece 14, and partially enlarged portions thereof, according to the present invention. In FIGS. 3A through 3D, the turning stocks of the bearing outer-race preformed piece 1 and the bearing inner-race preformed piece 14, which are formed by the cold rolling working, for manufacturing the products shown in FIGS. 1 and 2 are previously turned except for the portions of the bearing rings. FIG. 3A shows the bearing outer-race preformed piece 1. As shown in FIG. 3A, the internal bearing ring 7 is formed on the inner surface 2a of the bearing outer-race preformed piece 1 by the cold rolling working. FIG. 3B shows an enlarged portion in the circle of FIG. 3A. As can be clearly seen from FIG. 3B, the internal bearing ring 7 formed in the inner surface 2a comprises the right and left circular profile portions 11 and the flat profile portion 12 therebetween. FIG. 3C shows the bearing inner-race preformed piece 14. As shown in FIG. 3C, the external bearing ring 20 is formed in the outer surface 15b of the bearing inner-race preformed piece 14 by the cold rolling working. FIG. 3D shows an enlarged portion in the circle of FIG. 3C. As can be clearly seen from FIG. 3D, the external bearing ring 20 formed in the outer surface 15b comprises the right and left circular profile portions 23 and the flat profile portions 24 therebetween.

Figure 4:
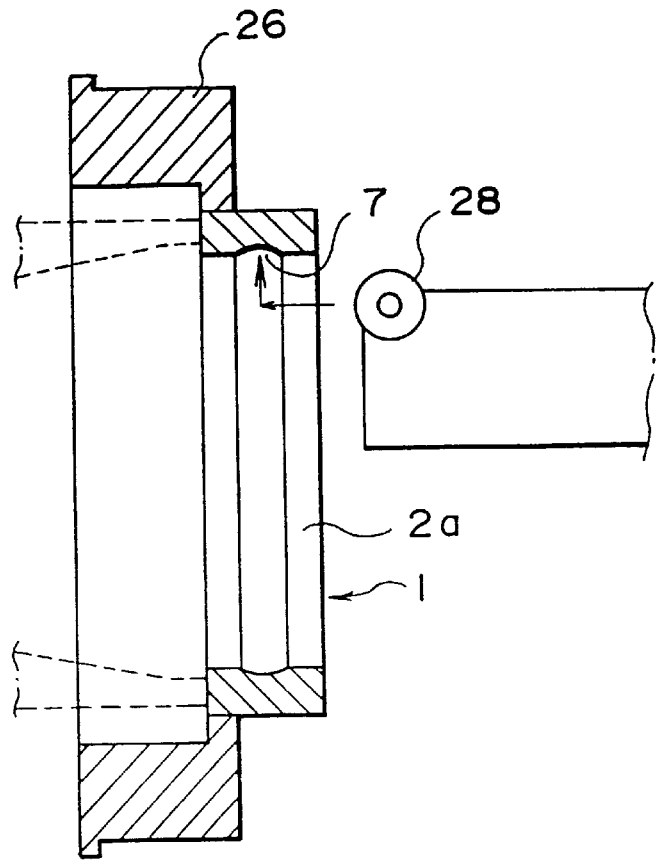
FIG. 4 is a view explaining a work holding state when the bearing outer-race preformed piece is turned.

FIG. 4 shows a method for holding the bearing outer-race preformed pieces 1, which was manufactured by the cold rolling working and wherein the turning stock of a portion other then the bearing ring was turned, on a single purpose lathe by means of an outer-diameter chuck 26 of a collet chuck, to turn and finish the inner surface 2a of the bearing outer-race preformed piece 1 by means of a turning tool for finishing 28 to manufacture a bearing outer-diameter product. The turning tool for finishing 28 moves in a direction of arrow toward the inner surface 2a of the bearing outer-race preformed piece 1 to turn the previously rolled internal bearing ring 7 of the bearing outer-race preformed piece 1 to finish the product internal bearing ring.

Figure 5:
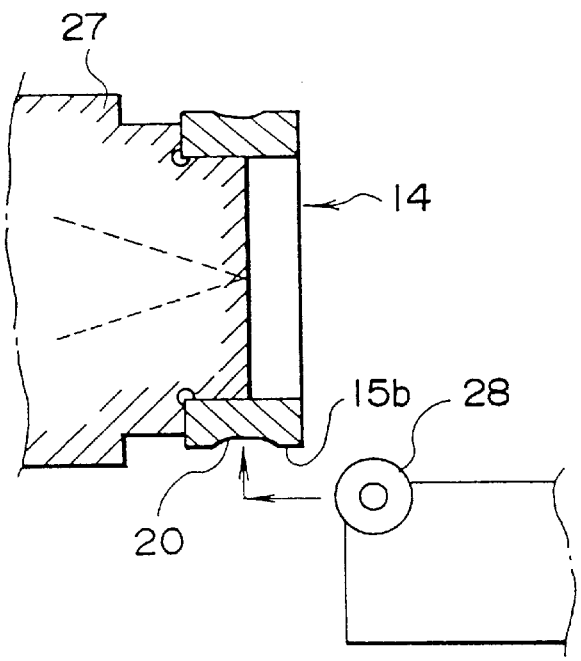
FIG. 5 is a view explaining a work holding state when the bearing inner-race preformed piece is turned.
Figure 6:
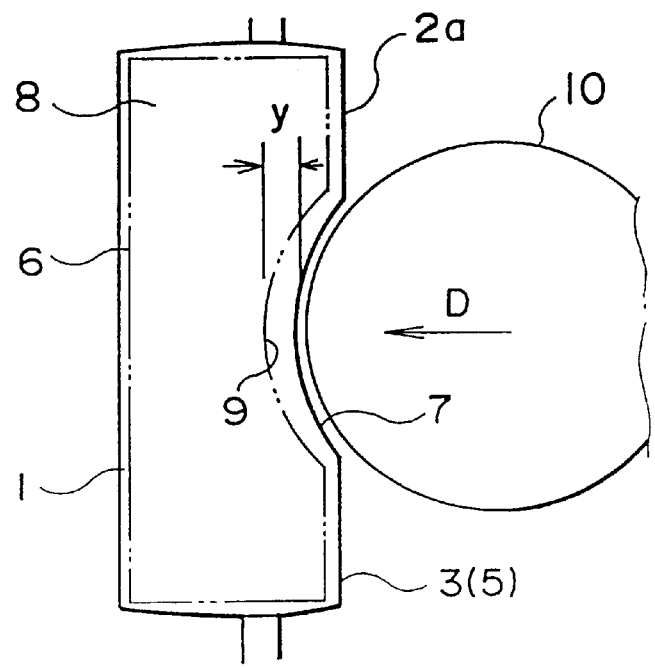
FIG. 6 is a sectional view explaining the shapes of conventional forming-die surfaces of a mandrel and a roll for forming bearing outer-race preformed piece; an FIG. 7 is a sectional view explaining the shapes of conventional forming-die surfaces of a mandrel and a roll for forming a bearing inner-race preformed piece.
Figure 7:
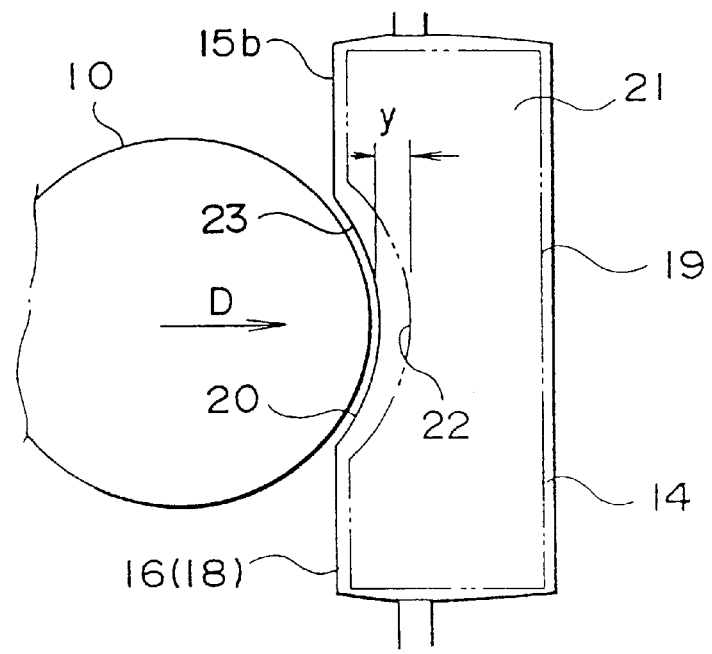

FIG. 5 shows a method for holding the bearing inner-race preformed pieces 14, which was manufactured by the cold rolling working and wherein the turning stock of a portion other then the bearing ring was turned, on a single purpose lathe by means of an inner-diameter chuck 27 of a collet chuck, i.e., a tightening chuck, to turn and finish the outer surface 15b of the bearing inner-race preformed piece 14 by means of the turning tool for finishing 28 to manufacture a bearing inner-diameter product. The turning tool for finishing 28 moves in a direction of arrow toward the outer surface 15b of the bearing outer-race preformed piece 1 to turn the previously rolled external bearing ring 20 of the bearing outer-race preformed piece 14 to finish the product internal bearing ring.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A bearing outer-race preformed piece including an inner surface having a cross-section which comprises:

a bearing groove comprising first and second curved portions having a locus of points which are located along a single circle of a fixed radius, and a flat portion adjoining and extending between said first and second curved portions.

2. A bearing inner-race preformed piece including an outer surface having a cross-section which comprises:

a bearing groove comprising first and second curved portions having a locus of points which are located along a single circle of a fixed radius, and a flat portion adjoining and extending between said first and second curved portions.

3. The bearing outer-race preformed piece according to claim 1, further comprising first and second straight portions located on each side of and adjoining said bearing groove, said first and second straight portions having a locus of points located along a single straight line extending parallel to said flat portion.

4. The bearing inner-race preformed piece according to claim 2, further comprising first and second straight portions located on each side of and adjoining said bearing groove, said first and second straight portions having a locus of points located along a single straight line extending parallel to said flat portion.

* * * * *